United States Patent
Tashiro et al.

(10) Patent No.: US 6,724,749 B1
(45) Date of Patent: Apr. 20, 2004

(54) INTERNET TELEPHONY SYSTEM

(75) Inventors: Masayuki Tashiro, Kawasaki (JP);
Kazuyuki Ohtsu, Kawasaki (JP);
Noriyuki Fukuyama, Kawasaki (JP);
Masanobu Morinaga, Kawasaki (JP);
Takahiro Shirakawa, Ishikawa (JP);
Kenichi Tonomura, Ishikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/428,112

(22) Filed: Oct. 27, 1999

(30) Foreign Application Priority Data

Feb. 19, 1999 (JP) .......................... 11-042248

(51) Int. Cl.$^7$ ............................................. H04L 12/66
(52) U.S. Cl. ................... 370/352; 370/401; 379/142.07
(58) Field of Search .................................. 370/352–356,
370/401, 260; 379/142.01, 142.07, 156,
157, 158, 171–173, 201.01, 202.01, 211.01,
211.02, 212.01, 221.01, 225

(56) References Cited

U.S. PATENT DOCUMENTS

| | | | | |
|---|---|---|---|---|
| 6,229,804 | B1 | * | 5/2001 | Mortsolf ..................... 370/352 |
| 6,275,574 | B1 | * | 8/2001 | Oran .......................... 379/201 |
| 6,339,594 | B1 | * | 1/2002 | Civanlar ..................... 370/352 |
| 6,449,260 | B1 | * | 9/2002 | Sassin et al. ................ 370/270 |
| 6,466,662 | B1 | * | 10/2002 | Klaghofer et al. ..... 379/212.01 |
| 2002/0057672 | A1 | * | 5/2002 | Komuro ...................... 370/352 |
| 2003/0095541 | A1 | * | 5/2003 | Chang et al. ............... 370/352 |

FOREIGN PATENT DOCUMENTS

| | | | |
|---|---|---|---|
| JP | 5-22439 | 1/1993 | |
| JP | 5-22457 | 1/1993 | |
| JP | 6-244859 | 9/1994 | |
| WO | WO 99/05590 | * 2/1999 | ............. G06F/3/00 |

* cited by examiner

*Primary Examiner*—Ajit Patel
*Assistant Examiner*—Chirag Shah
(74) *Attorney, Agent, or Firm*—Katten Muchin Zavis Rosenman

(57) ABSTRACT

An internet telephony system includes a plurality of switching equipment which accommodate a plurality of terminals which can perform at least one of voice communication and data communication, an internet network including a gate keeper, and a plurality of gateways which connect the plurality of switching equipment to the internet network and make it possible to perform communication through the switching equipment and the internet network by communication protocol conversion. In a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with the second switching equipment and the second terminal is performed, the gate keeper checks whether path replacement for setting the call transfer operation is required or not, and the communication between the second terminal and the third terminal after the call transfer operation is provided by a communication path managed by the second switching equipment.

19 Claims, 15 Drawing Sheets

------ PATH BEFORE TRANSFER(P0)
——— PATH AFTER TRANSFER(P1, P2, P3)
·········· SIGNAL LINK BEFORE TRANSFER(S1)
——— SIGNAL LINK SPREAD AFTER TRANSFER (S2)

- - - - - PATH BEFORE TRANSFER(P10)
———— PATH AFTER TRANSFER(P11)
·········· SIGNAL LINK BEFORE TRANSFER(S1)
———— SIGNAL LINK SPREAD AFTER TRANSFER (S2)

ORIGINATING DIAL SPECIAL NUMBER-IP ADDRESS CONVERSION TABLE

FIG.11

| ORIGINATING DESTINATION | ORIGINATING SPECIAL NUMBER | IP ADDRESS | PATH REPLACEMENT |
|---|---|---|---|
| SWITCHING EQUIPMENT 1 | 701 | — | ○ |
| SWITCHING EQUIPMENT 2 | 702 | — | ○ |
| SWITCHING EQUIPMENT 3 | 703 | — | × |
| SWITCHING EQUIPMENT 4 | 704 | — | × |
| GW1 | 711 | 000.000.000.001 | ○ |
| GW2 | 712 | 000.000.000.002 | ○ |
| GW3 | 713 | 000.000.000.003 | × |
| GW4 | 714 | 000.000.000.004 | × |
| TERMINAL 50 | 50 | 000.000.000.005 | × |

FIG.14

830 ORIGINATING DIAL SPECIAL NUMBER-IP ADDRESS CONVERSION TABLE

| ORIGINATING DIAL SPECIAL NUMBER | IP ADDRESS |
|---|---|
| 701 | 000.000.000.001 |
| 702 | 000.000.000.002 |
| 703 | 000.000.000.003 |
| 704 | 000.000.000.004 |
| 711 | 000.000.000.001 |
| 712 | 000.000.000.002 |
| 713 | 000.000.000.003 |
| 714 | 000.000.000.004 |
| 00 | 000.000.000.005 |

FIG.15

830 PATH REPLACEMENT ENABLED/DISABLED TABLE

| IP ADDRESS | PATH REPLACEMENT ENABLED/DISABLED FLAG |
|---|---|
| 000.000.000.001 | 1 |
| 000.000.000.002 | 1 |
| 000.000.000.003 | 0 |
| 000.000.000.004 | 0 |
| 000.000.000.005 | 0 |

PRESENCE/ABSENCE OF PATH REPLACEMENT
1: PATH REPLACEMENT IS ENABLED
0: PATH REPLACEMENT IS DISABLED

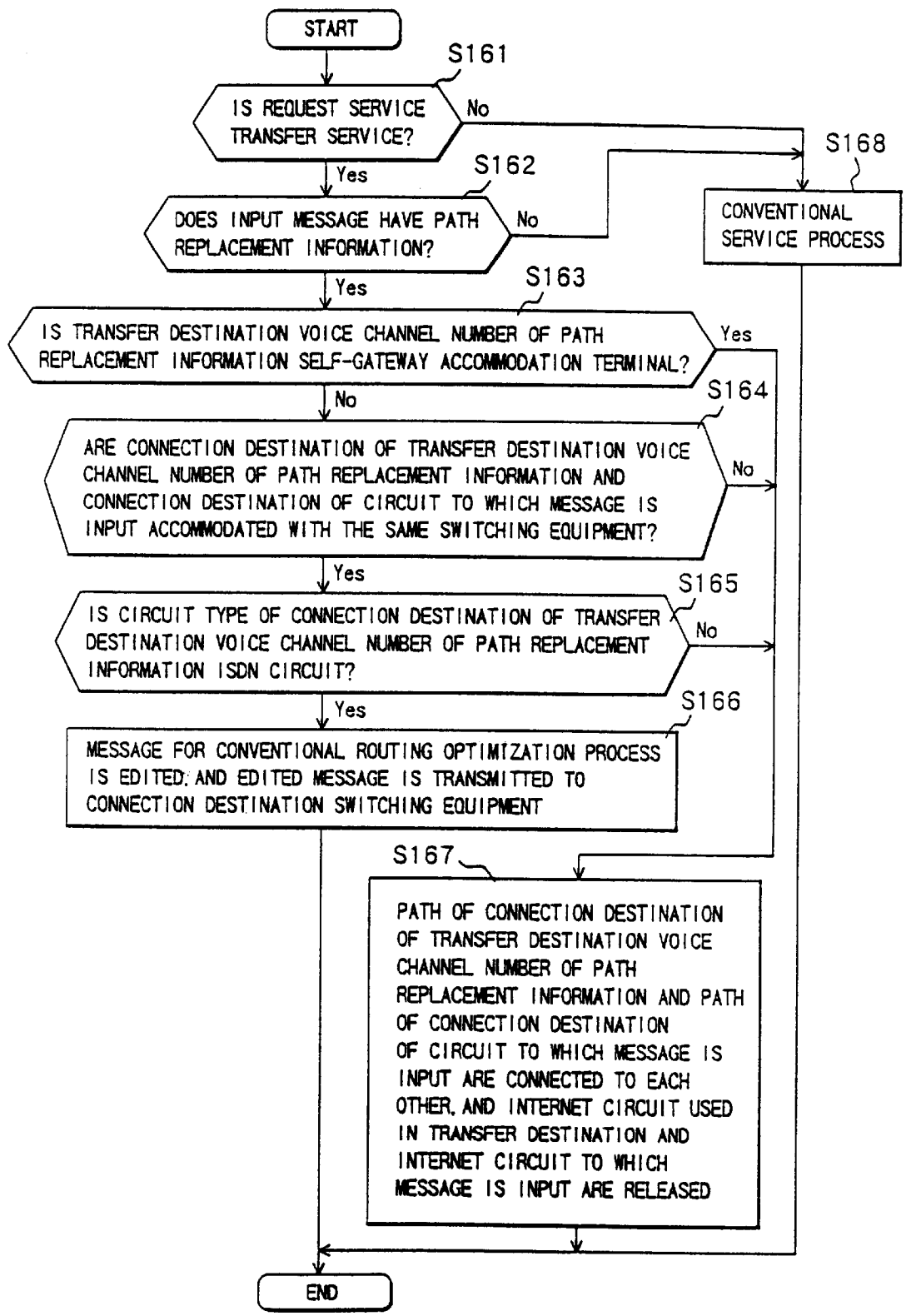

INTERNET TELEPHONY SYSTEM

BACKGROUND OF THE INVENTION

The present invention relates to a composite switching network system in which telephone networks and an internet network are integrated to reduce costs of equipment and operations and, more particularly, to an internet telephony system which make it possible to realize a transfer service from at least one communication state of voice and data obtained through an internet network.

In recent years, with advancement of network technology such as an increase in bandwidth of a local area network (LAN) and advancement of personal computer (PC) technology such as an increase in number of functions of a PC and an increase in speed of a CPU applied to a PC, high-speed communication of voice information between PCs on a plurality of LANs can be practical. With the technical advancement, application software in which conventional voice communication by telephones is executed between PCs on an internet network constituted by LANs and wide area networks (WANs) and a hardware system in which the application software is built are rapidly put on the market. This system is called an "internet telephony" system. In the internet telephony system, Voice over Internet Protocol (VOIP) technique is used to integrate voice communication and data communication. According to the VOIP technique, on protocol of a network layer used in the Internet, i.e., on a network (IP network) having IP, voice is converted into a frame for a short period of time (about 20 ms), and the frame is added with an IP header to be transmitted and received as a packet. The origin of transmission/reception of voice information on a computer network is old. In 1974, an experiment of the transmission/reception is performed on ARPANET which is the forerunner of the Internet (see Danny Cohen, "RFC741: Specifications for the Network Voice Protocol (NVP)," IETF, 1976).

In addition, an internet telephony gateway, having a gateway function for performing communication protocol conversion between a telephone network and an internet network, for realizing communication between the telephone network and the internet network is developed. A system (composite switching network system) which uses the internet telephony gateway to perform repeating between switching equipment of conventional telephone networks by the internet network is proposed. This system has been practically used. The system which performs repeating between switching equipment by the internet network is called "middle omission caused by internet telephony".

In general, telephone communication by a system in which middle omission is caused by internet telephony can be operated at a cost lower than that of telephone communication (voice communication) performed by a conventional telephone network. The middle omission system and a service thereof have rapidly spread.

However, in the conventional technique, the technique of a transfer service made by the middle omission system achieved by the internet telephony gateway is not established.

At present, there are only ITU-T recommendation H.450.2 which defines the service in the internet network and the service of conventional telephone networks. In the recommendation H.450.2, a control procedure and signal protocol of a call transfer service (Call Transfer Supplementary Service: SSCT) in a multimedia communication system in a packet mode regulated by recommendation H.323 are regulated.

When the transfer service is realized by using the services of the internet network and the telephone networks, unnecessary use of the internet circuit is inevitable on a switching equipment side, and the quality of voice communication may be degraded by inter-network matching control of transmission rates performed by CODEC set in gateways. The details of the problem will be described later with reference to the accompanying drawings.

SUMMARY OF THE INVENTION

It is, therefore, an object of the present invention to provide an internet telephony system which can perform effective path connection in a transfer operation through an internet network, and not only achieves effective use of internet circuits but also can improve the quality of voice communication and processing capability because CODEC control is not performed.

In order to solve the above problem, there is provided an internet telephony system according to an aspect of the present invention comprising a plurality of switching equipment which accommodate a plurality of terminals which can perform at least one of voice communication and data communication, an internet network including a gate keeper, and a plurality of gateways which connect the plurality of switching equipment to the internet network and make it possible to perform communication through the switching equipment and the internet network by communication protocol conversion, wherein, in a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with the second switching equipment and the second terminal is performed, the gate keeper checks whether path replacement for setting the call transfer operation is required or not, and communication between the second terminal and the third terminal after the call transfer operation is provided by a communication path managed by the second switching equipment.

In this internet telephony system, when the path replacement is required, the gate keeper adds information for path replacement to an information element of a message regulated by a specific communication protocol related to the call transfer operation to notify the second switching equipment on a path replacement side of the information through a corresponding gateway. The specific communication protocol related to the call transfer operation is H.450.2.

The gate keeper has a function of checking whether the path replacement is enabled/disabled by an internet protocol address of a notification destination. More specifically, the gate keeper checks whether path replacement is enabled/disabled by checking whether an internet protocol address of the second terminal of a transfer source destination corresponding to the first terminal of a transfer source coincides with an internet protocol address of the third terminal of a transfer destination.

In addition, each of the plurality of terminals is one of a telephone terminal and a computer terminal.

There is provided an internet telephony system according to another aspect of the present invention comprising a plurality of switching equipment which accommodate a plurality of terminals which can perform at least one of voice communication and data communication, an internet network including a gate keeper, and a plurality of gateways which connect the plurality of switching equipment to the internet network, make it possible to perform communication through the switching equipment and the internet network by communication protocol conversion, and accommodate a terminal which can perform at least one of voice communication and data communication, wherein, in a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with a first gateway of the plurality of gateways corresponding to the second switching equipment, and the second terminal is performed, the gate keeper checks whether path replacement for setting the call transfer operation is required or not, and communication between the second terminal and the third terminal after the call transfer operation is provided by a communication path managed by the second switching equipment and a communication path managed by the first gateway.

There is provided an internet telephony system according to still another aspect of the present invention comprising a plurality of switching equipment which accommodate a plurality of terminals which can perform at least one of voice communication and data communication, an internet network including a gate keeper, and a plurality of gateways which connect the plurality of switching equipment to the internet network and make it possible to perform communication through the switching equipment and the internet network by communication protocol conversion, wherein, in a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with a third switching equipment connected to a first gateway of the plurality of gateways, corresponding to the second switching equipment, and the second terminal is performed, the gate keeper checks whether path replacement for setting the call transfer operation is required or not, and communication between the second terminal and the third terminal after the call transfer operation is provided by communication paths respectively managed by the second switching equipment and the third switching equipment and a communication path managed by the first gateway.

In this configuration, the second switching equipment and the third switching equipment are constituted by a plurality of switching equipment which are physically different from each other. The plurality of switching equipment which are physically different from each other can employ such a configuration that the plurality of switching equipment are logically connected to the same first gateway.

There is provided a gate keeper according to an aspect of the present invention comprising means for checking whether path replacement for setting a call transfer operation is required or not, means for adding information for the path replacement to an information element of a message regulated by a specific communication protocol related to the call transfer operation when the path replacement is required, and means for notifying a second switching equipment on a path replacement side of the information through a corresponding gateway, wherein, in the call transfer operation in which transition from a communication state, through an internet network, between a first terminal accommodated with a first switching equipment and a second terminal accommodated with the second switching equipment to a communication state between a third terminal accommodated with the second switching equipment and the second terminal is performed, communication between the second terminal and the third terminal after the call transfer operation is provided by a communication path managed by the second switching equipment.

There is provided a gate keeper according to another aspect of the present invention comprising means for checking whether path replacement for setting a call transfer operation is required or not, means for adding information for the path replacement to an information element of a message regulated by a specific communication protocol related to the call transfer operation when the path replacement is required, and means for notifying a second switching equipment on a path replacement side of the information through a corresponding gateway, wherein, in the call transfer operation in which transition from a communication state, through an internet network, between a first terminal accommodated with a first switching equipment and a second terminal accommodated with the second switching equipment to a communication state between a third terminal accommodated with the gateway corresponding to the second switching equipment, and the second terminal is performed, communication between the second terminal and the third terminal after the call transfer operation is provided by a communication path managed by the second switching equipment and a communication path managed by the gateway.

There is provided a gate keeper according to still another aspect of the present invention comprising means for checking whether path replacement for setting a call transfer operation is required or not, means for adding information for the path replacement to an information element of a message regulated by a specific communication protocol related to the call transfer operation when the path replacement is required, and means for notifying a second switching equipment on a path replacement side of the information through a corresponding gateway, wherein, in the call transfer operation in which transition from a communication state, through an internet network, between a first terminal accommodated with a first switching equipment and a second terminal accommodated with the second switching equipment to a communication state between a third terminal accommodated with a third switching equipment connected to the gateway, corresponding to the second switching equipment, and the second terminal is performed, communication between the second terminal and the third terminal after the call transfer operation is provided by communication paths respectively managed by the second switching equipment and the third switching equipment and a communication path managed by the gateway.

There is provided a gateway according to an aspect of the present invention comprising means for checking whether path replacement for setting a call transfer operation is required or not, means for adding information for the path replacement to an information element of a message regulated by a specific communication protocol related to the call transfer operation when the path replacement is required, and means for notifying a second switching equipment on a path replacement side of the information through self-gateway, wherein, in the call transfer operation in which transition from a communication state, through an internet network, between a first terminal accommodated with a first switching equipment and a second terminal accommodated with the second switching equipment to a communication state between a third terminal accommodated with the second switching equipment and the second terminal is performed, communication between the second terminal and the third terminal after the call transfer operation is provided by a communication path managed by the second switching equipment.

There is provided a gateway according to another aspect of the present invention comprising means for checking whether path replacement for setting a call transfer operation is required or not, means for adding information for the path replacement to an information element of a message regulated by a specific communication protocol related to the call transfer operation when the path replacement is required, and means for notifying a second switching equipment on a path replacement side of the information through self-gateway, wherein, in the call transfer operation in which transition from a communication state, through an internet network, between a first terminal accommodated with a first switching equipment and a second terminal accommodated with the second switching equipment to a communication state between a third terminal accommodated with the self-gateway, corresponding to the second switching equipment, and the second terminal is performed, communication between the second terminal and the third terminal after the call transfer operation is provided by a communication path managed by the second switching equipment and a communication path managed by the self-gateway.

There is provided a gateway according to still another aspect of the present invention comprising means for checking whether path replacement for setting a call transfer operation is required or not, means for adding information for the path replacement to an information element of a message regulated by a specific communication protocol related to the call transfer operation when the path replacement is required, and means for notifying a second switching equipment on a path replacement side of the information through self-gateway, wherein, in the call transfer operation in which transition from a communication state, through an internet network, between a first terminal accommodated with a first switching equipment and a second terminal accommodated with the second switching equipment to a communication state between a third terminal accommodated with a third switching equipment connected to the self-gateway, corresponding to the second switching equipment, and the second terminal is performed, communication between the second terminal and the third terminal after the call transfer operation is provided by communication paths respectively managed by the second switching equipment and the third switching equipment and a communication path managed by the self-gateway.

With the configuration described above, effective path connection can be performed in a transfer operation through the internet network. Not only effective use of internet circuits can be achieved, but also the quality of voice communication and processing capability can be improved because CODEC control is not performed.

BRIEF DESCRIPTION OF THE DRAWINGS

These objects and advantages of this invention will become more apparent and more readily appreciated from the following detailed description of the presently preferred examplary embodiments, taken in conjunction with the accompanying drawings of which:

FIG. 11 is a chart showing environmental data in the embodiment;

FIG. 14 is a chart showing an originating dial special number IP address conversion table in the embodiment;

FIG. 15 is a chart showing a concrete path replacement enabled/disabled table in the embodiment;

FIG. 17 is a flow chart showing a path replacement analyzing procedure of a gateway in the embodiment.

DETAILED DESCRIPTION OF THE PREFERRED EMBODIMENT

Conventional Internet Telephony System

Figure 1:
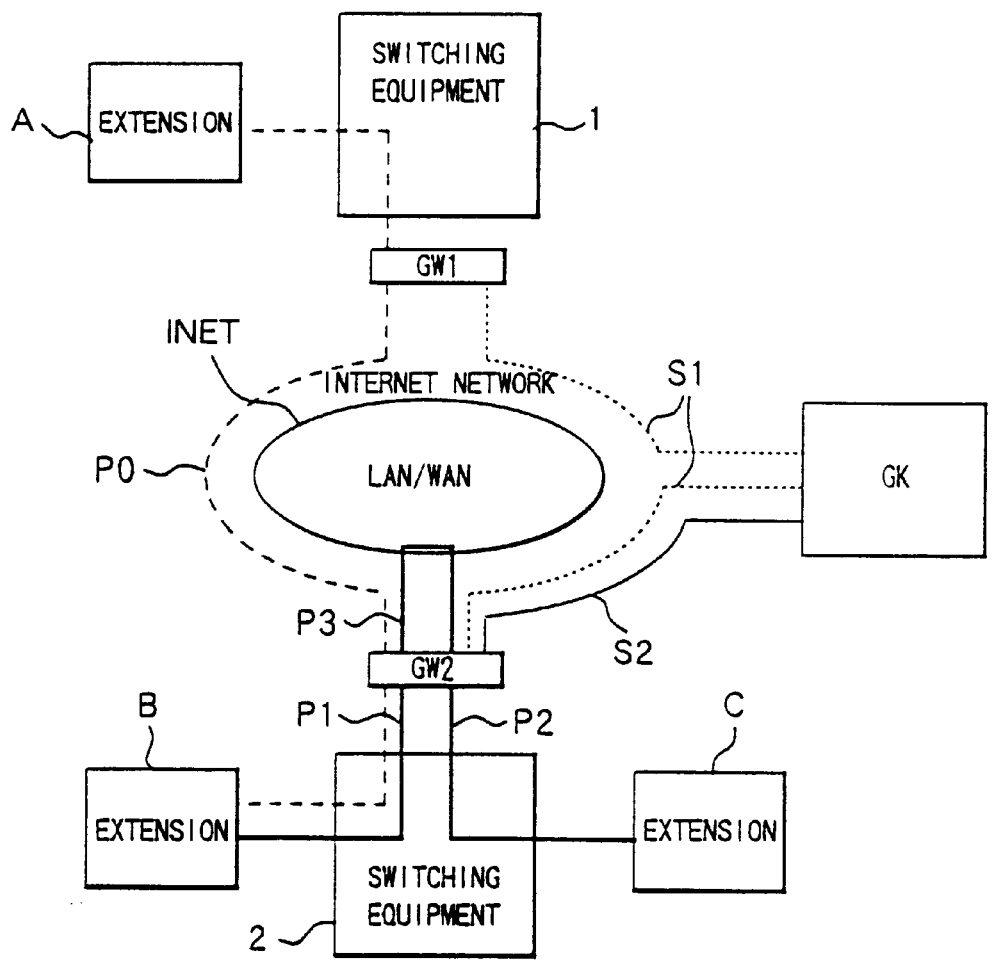
FIG. 1 is a block diagram for explaining a transfer service in a conventional internet telephony system.

Referring to FIG. 1, in a conventional internet telephony system, during voice communication between an extension (terminal) A accommodated with a switching equipment 1 and an extension B accommodated with a switching equipment 2 through a connection path (path before transfer: P0), when a call transfer operation is performed from the extension A to an extension C accommodated with the switching equipment 2, a gate keeper GK recognizes the transfer operation from the extension A to the extension C to make a connection request between an internet circuit used in the extension B and an internet circuit used in an incoming operation of the extension C.

In this manner, although a connection path (path after transfer) between the extension B and the extension C is formed as shown in FIG. 1, circuits P1 and P2 between the switching equipment 2 and a gateway GW2 and an internet circuit P3 of the gateway GW2 are wasted. Since the CODEC control is performed in the gateway GW2 by connection through an internet network INET (LAN or WAN), the quality of voice communication is degraded. Note that, in FIG. 1, reference symbol S1 denotes a signal link (H.225 link) before transfer, and reference symbol S2 denotes a signal link (H.225 link) set after transfer. These signal links are released upon completion of the transfer operation.

Internet Telephony System of the Present Invention

Figure 2:
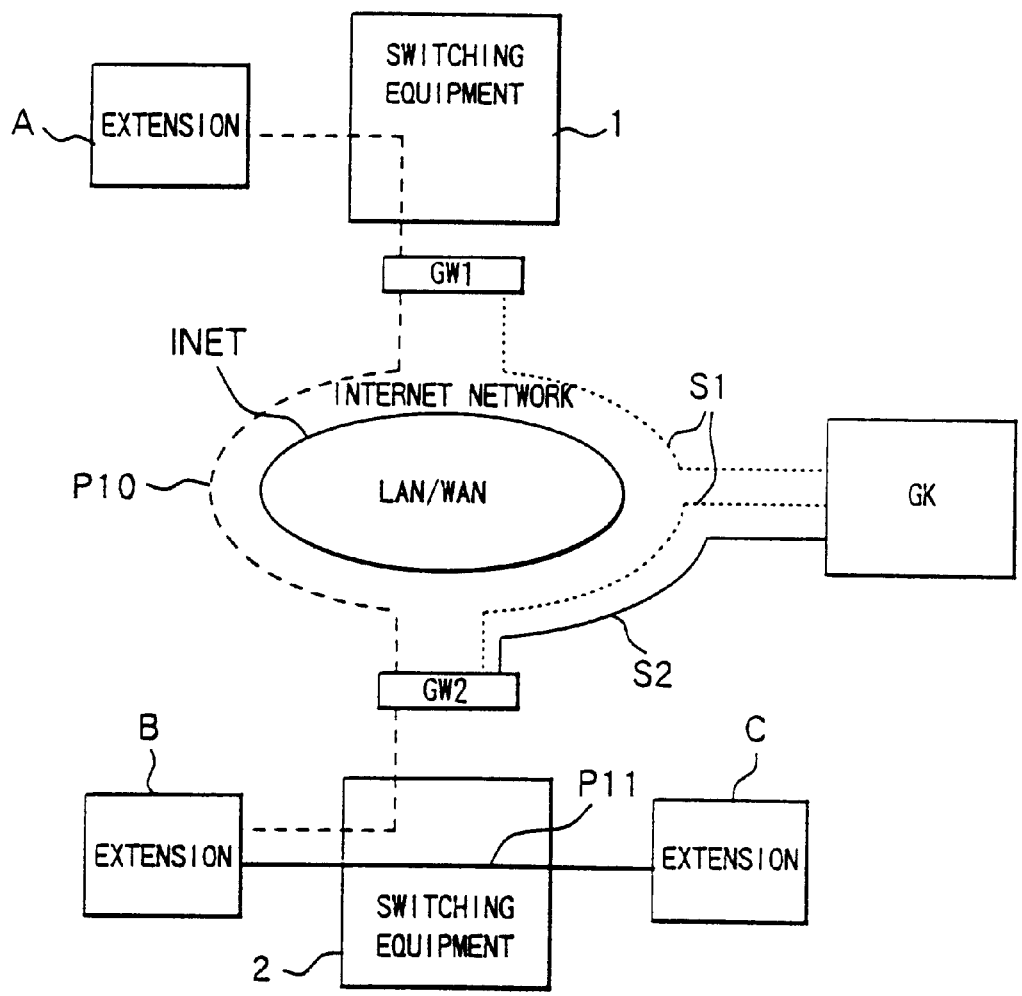
FIG. 2 is a block diagram for explaining an outline of a transfer service in an internet telephony system according to an embodiment of the present invention.

On the other hand, in an internet telephony system according to an embodiment of the present invention, as shown in the concept of FIG. 2, a path replacement analyzing function and a path replacement notifying function are given to a gate keeper GK of an internet network INET (LAN or WAN), and a switching equipment 2 receives path replacement information output from the gate keeper GK through the gateway GW2 through a signal link S1 (H.225 link) before transfer, so that path replacement in a call transfer operation from a voice communication state between an extension (terminal) A accommodated with a switching equipment 1 and an extension B accommodated with the switching equipment 2 to a voice communication state to an extension C accommodated with the switching equipment 2 is realized. A path P11 obtained after the transfer operation between the extension B and the extension C is not through a circuit of the internet network INET. In FIG. 2, reference symbol P10 denotes a path before transfer, and reference symbol S2 denotes a signal link (H.225 link) set after transfer. These signal links are released upon completion of the transfer operation.

Figure 3:
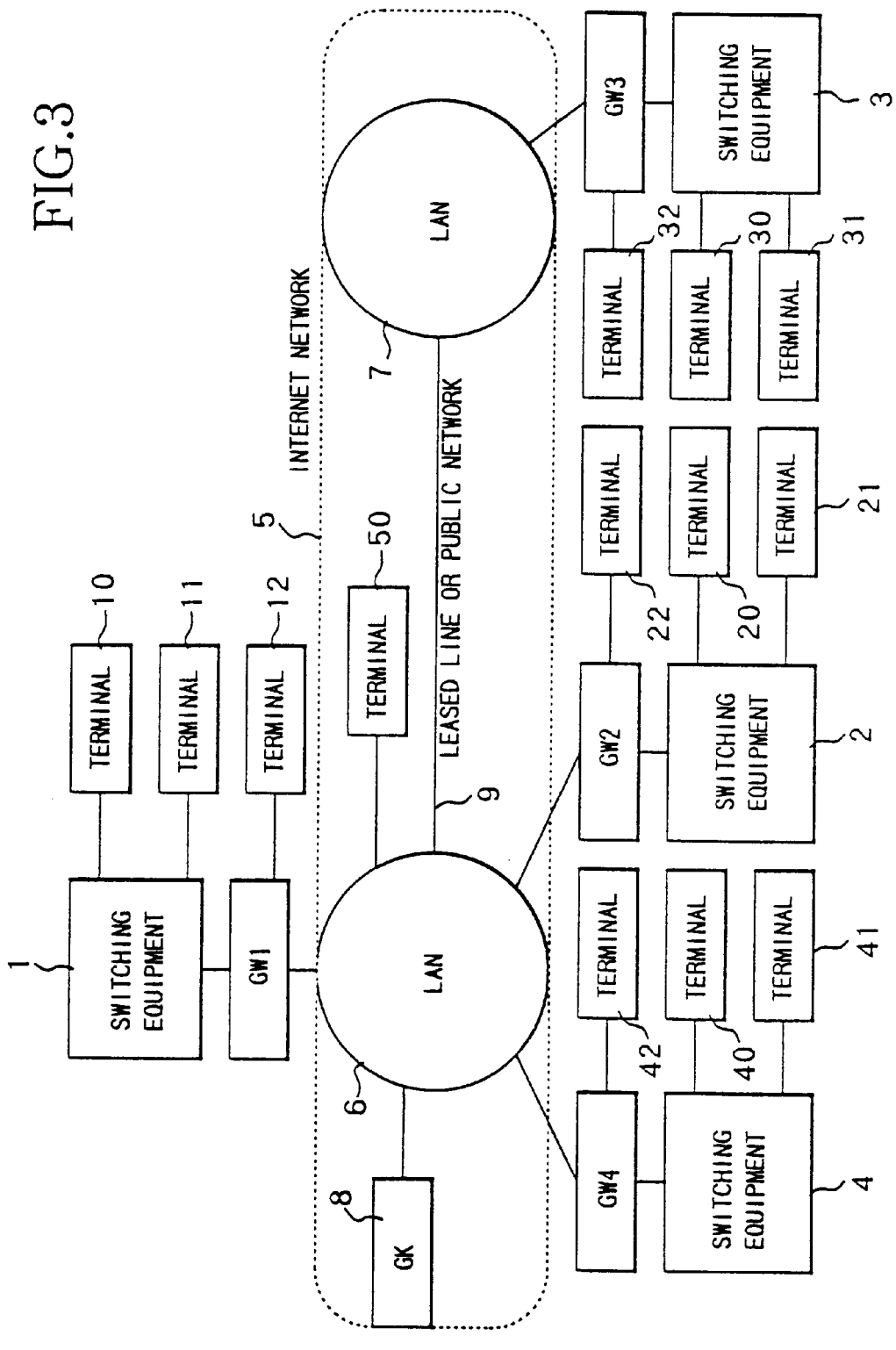
FIG. 3 is a block diagram showing the configuration of the internet telephony system according to the embodiment of the present invention.

Referring to FIG. 3 showing the concrete configuration of the internet telephony system according to the embodiment of the present invention, the switching equipment 1 constituting a telephone network accommodates a terminal 10 and a terminal 11. The switching equipment 2 accommodates a terminal 20 and a terminal 21. A switching equipment 3 accommodates a terminal 30 and a terminal 31, and a switching equipment 4 accommodates a terminal 40 and a terminal 41.

Gateways (internet telephony gateways) GW1, GW2, GW3, and GW4 accommodate terminals 12, 22, 32, and 42, respectively, and connect the switching equipment 1, 2, 3, and 4 to an internet network 5. Each terminal may be constituted by not only a telephone terminal having a voice communication function but also a data terminal such as a personal computer (PC) having a data communication function.

The internet network 5 has a LAN 6 connected to the gateways GW1, GW2, and GW4 and a LAN 7 connected to the gateway GW3. The LAN 6 and (or) the LAN 7 may be connected to a WAN (not shown). The LAN 6 accommodates a terminal 50 and is connected to a gate keeper (GK) 8. The LAN 6 and the LAN 7 are connected through a leased line or a public network 9. Although not shown, the LAN 7 also accommodates a terminal.

The gate keeper 8 manages the addresses of the terminal 50 and gateways GW1, GW2, GW3, and GW4 accommodated with a LAN or a WAN. The plurality of switching equipment 1, 2, 3, and 4 are constituted by a plurality of switching equipment which are physically different from each other. The plurality of switching equipment which are physically different from each other can also employ such a configuration that the plurality of switching equipment are logically connected to the same corresponding gateway. By this configuration, a middle omission repeating network of the internet telephony is constituted.

In the internet telephony system described above, in a voice communication state between the terminal 10 accommodated with the switching equipment 1 and the terminal 20 accommodated with the switching equipment 2, a case wherein the terminal 10 performs a transfer service to the terminal 21 accommodated with the switching equipment 2 will be described below with reference to FIG. 3 and related diagrams.

Gate Keeper

Figure 4:
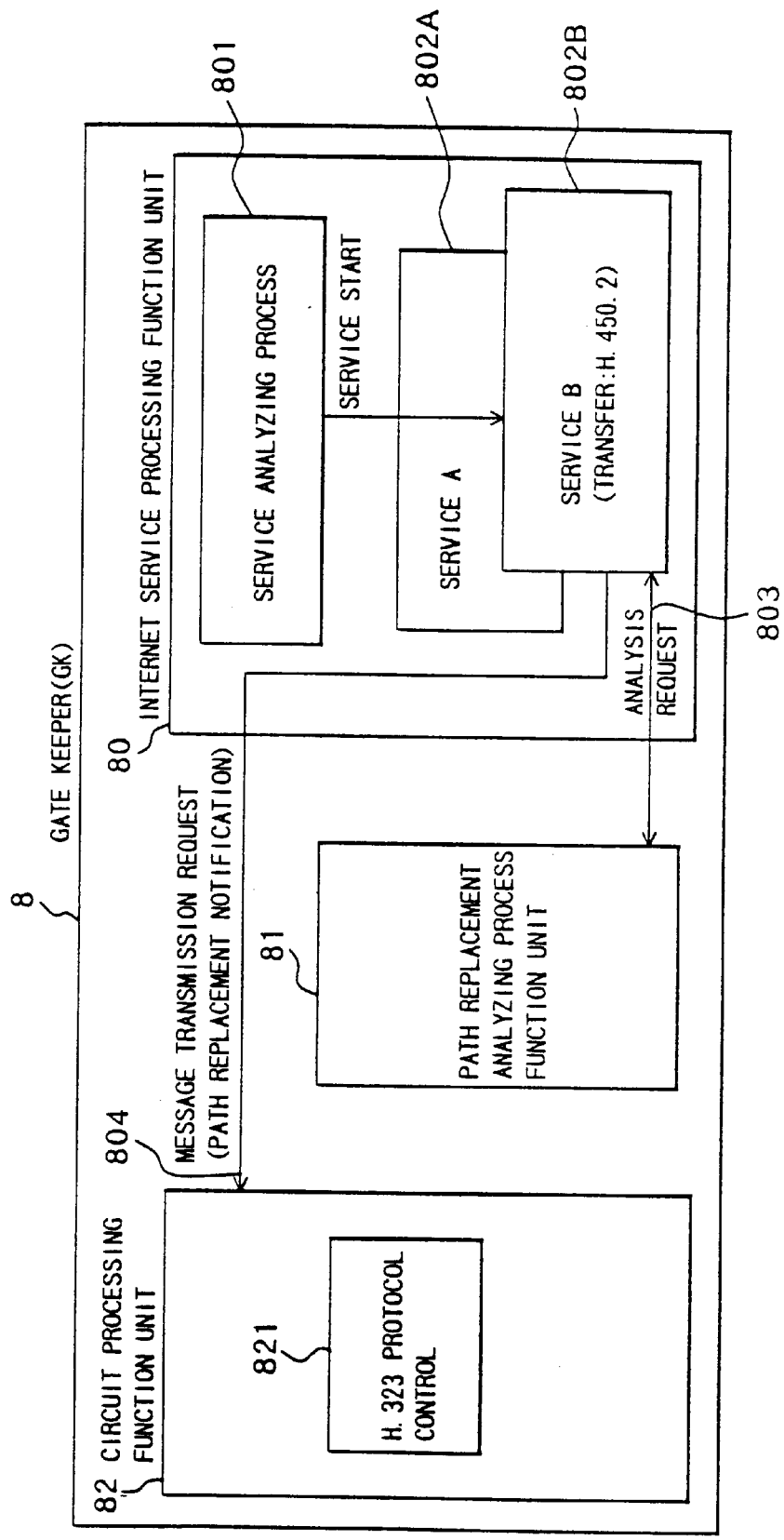
FIG. 4 is a block diagram showing the configuration of a gate keeper in FIG. 3.

The gate keeper (GK) 8, as shown in FIG. 4, is constituted by an internet service processing function unit 80, a path replacement analyzing process function unit 81, and a circuit processing function unit 82. The internet service processing function unit 80 performs a service analyzing process 801 for analyzing a process request of an internet service to determine a start service and service processes 802A and 802B. The path replacement analyzing process function unit 81 analyzes path replacement depending on an analyzing request 803 from the internet service processing function unit 80. The circuit processing function unit 82 performs H.323 protocol control 821.

Figure 5:
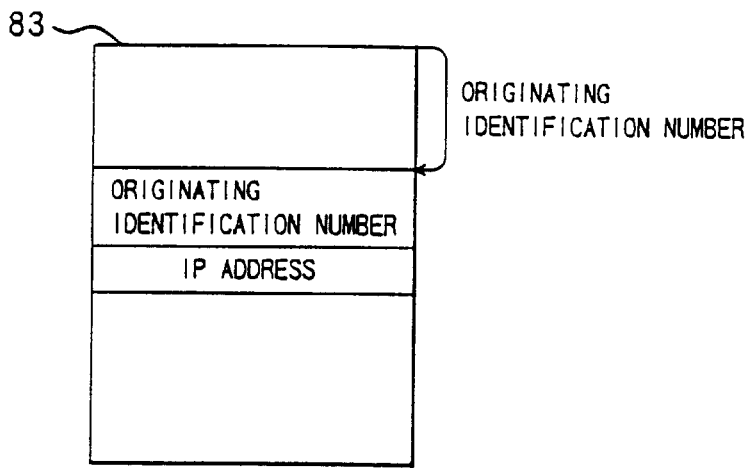
FIG. 5 is a chart showing an originating dial special number-IP address conversion table in the embodiment.
Figure 6:
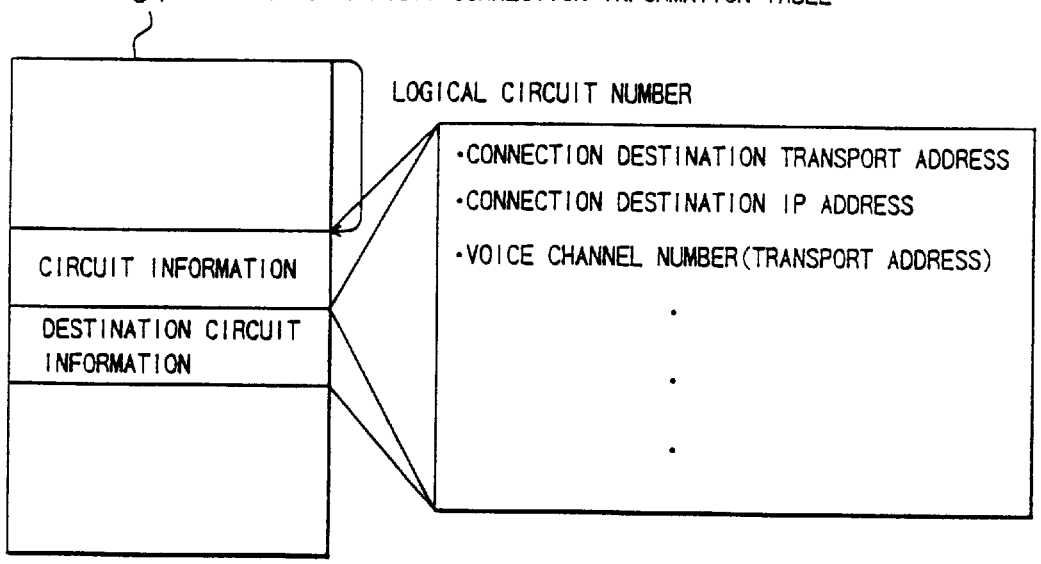
FIG. 6 is a chart showing a gate keeper circuit connection information table in the embodiment.

The gate keeper 8, as shown in FIG. 5 and FIG. 6, has an originating dial special number-IP address conversion table 83 in which data for determining an incoming destination (transfer destination) IP address on the basis of an incoming number (originating identification number), and a gate keeper circuit connection information table 84 for managing a transfer source and circuit connection information including a voice channel number (transport address) of a circuit used in connection between the terminal of a transfer source destination and the terminal of a transfer destination, an IP address and the like on the basis of a logical circuit number such that the circuit connection information can be indexed.

The internet service processing function unit 80 in the gate keeper 8 executes an internet service according to a request of a destination. At this time, when a request service is a transfer service, the analyzing request 803 is performed to the path replacement analyzing process function unit 81. When the analysis result requires path replacement, the internet service processing function unit 80 requests the circuit processing function unit 82 of a path switching notification 804 as a message transmission request.

The path replacement analyzing process function unit 81 extracts a transfer source IP address corresponding to the terminal 21 from the originating dial special number-IP address conversion table 83 in FIG. 5 on the basis of transfer request message information received from the internet service processing function unit 80. The path replacement analyzing process function unit 81 compares the IP address of the transfer source destination terminal 20 with the IP address of the transfer destination terminal 21 to analyze whether path replacement is required or not.

Figure 7:
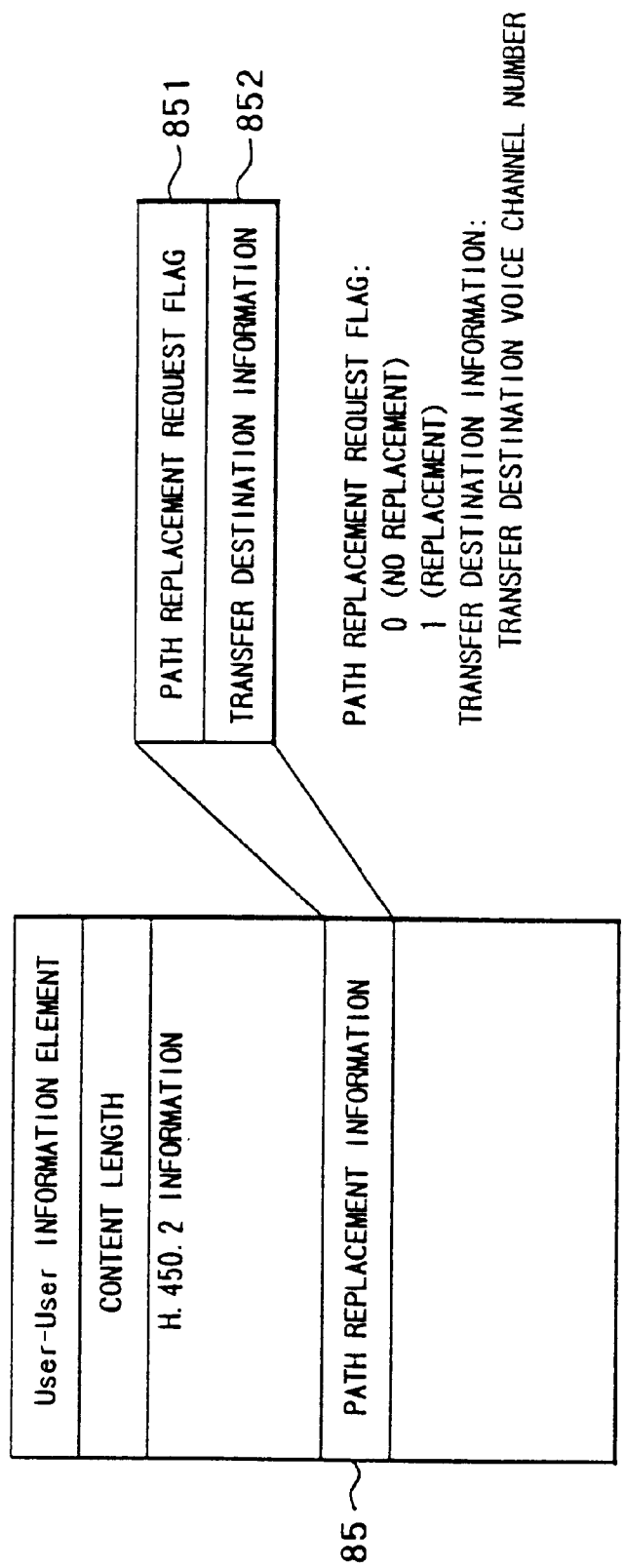
FIG. 7 is a chart showing path replacement information in the embodiment.

When the path replacement is required, the circuit processing function unit 82 sets, for a path replacement destination, path replacement information 85 shown in FIG. 7 as path replacement information of a User-User information element of a message regulated by recommendation H.450.2 to transmit the path replacement information. The path replacement information 85 includes a path replacement request flag (0: no replacement, 1: replacement) 851 and a transfer destination information (transfer destination voice channel number) 852. When path replacement is not required, as described above, H.323 (H.450.2) protocol control 821 is performed.

Figure 8:
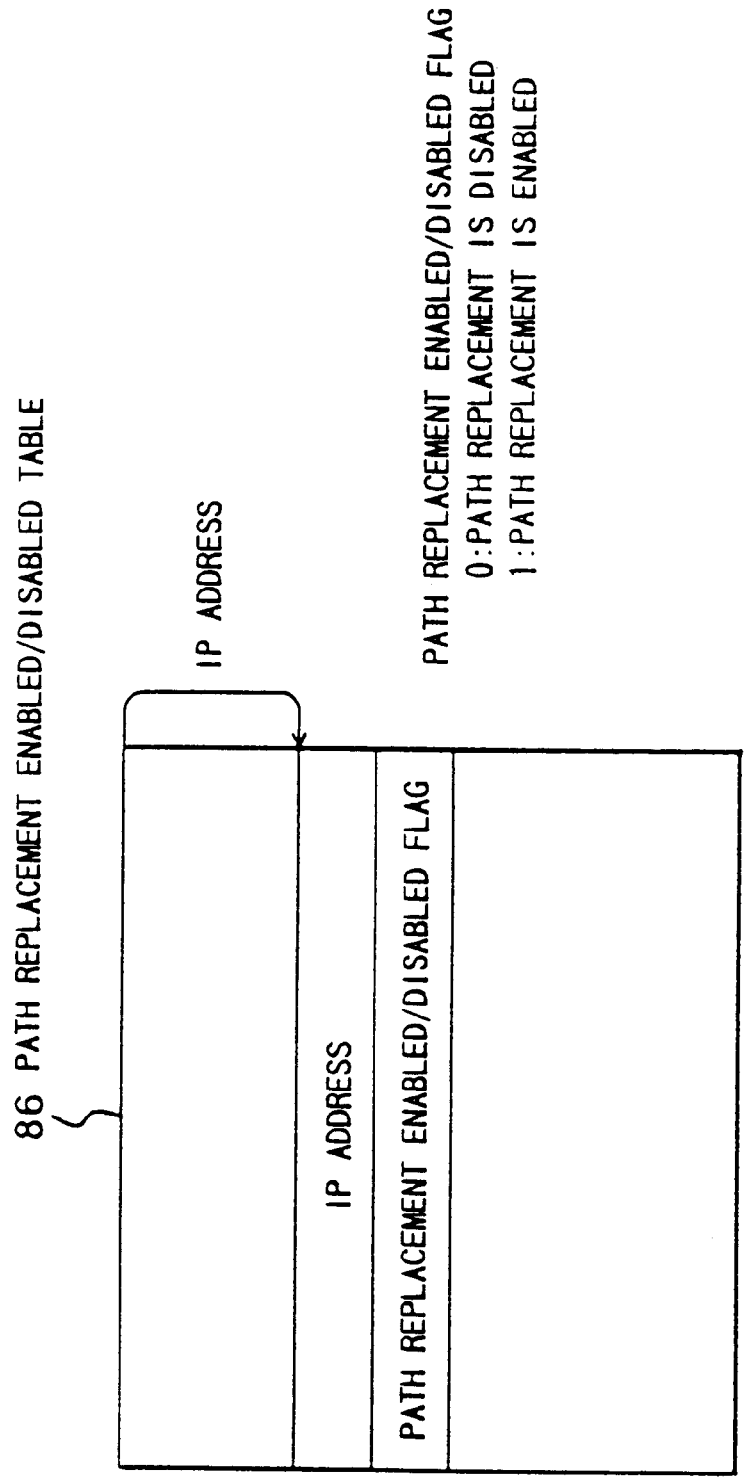
FIG. 8 is a chart showing a path replacement enabled/disabled table in the embodiment.

The gate keeper 8 has a path replacement enabled/disabled table 86 shown in FIG. 8. The gate keeper 8 comprises a function of determining the presence/absence of edition of the path replacement information 85 of the User-User information element shown in FIG. 7 with reference to the data of the table 86 when path replacement is required.

Gateway

Figure 9:
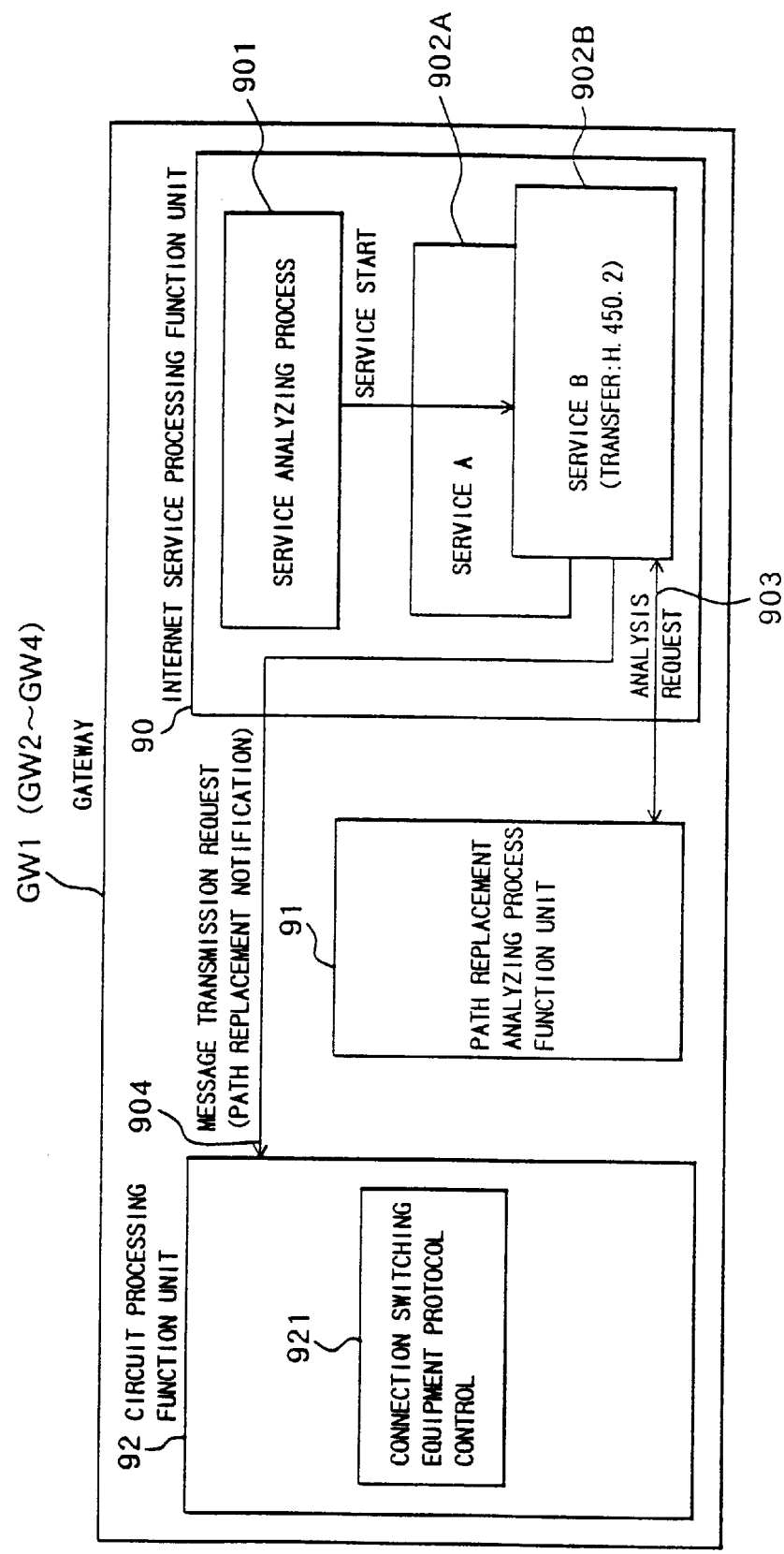
FIG. 9 is a block diagram showing the configuration of the gateway in FIG. 3.

Each of the gateways GW1, GW2, GW3, and GW4, as shown in FIG. 9, is constituted by an internet service processing function unit 90, a path replacement analyzing process function unit 91, and a circuit processing function unit 92. The internet service processing function unit 90 performs a service analyzing process 901 for analyzing a process request of an internet service to determine a start service and service processes 902A and 902B. The path replacement analyzing process function unit 91 analyzes path replacement depending on an analyzing request 903 from the internet service processing function unit 90. The circuit processing function unit 92 performs protocol control 921 of a connection telephone switching equipment.

The internet service processing function unit 90 executes an internet service according to a request of a destination. At this time, when a request service is a transfer service, the analyzing request 903 is performed to the path replacement analyzing process function unit 91. When the analysis result requires path replacement, the internet service processing function unit 90 requests the circuit processing function unit 92 of a path switching notification 904 as a message transmission request.

The path replacement analyzing process function unit 91 extracts the path replacement information 85 from the User-User information element shown in FIG. 7 of the received transfer message. When the extracted information represents the presence of path replacement, i.e., when the path replacement request flag 851 is "1", replacement destination circuit (circuit connected to the internet circuit of a transfer destination) is extracted on the basis of the transfer destination information 852 of the path replacement information 85. In this case, a circuit, on the gateway GW2 side, for connecting the gateway GW2 used in the transfer destination terminal 21 to the switching equipment 2 and a transfer circuit, i.e., a circuit, on the gateway GW2 side, for connecting the gateway GW2 used in the terminal 20 to the switching equipment 2 are extracted.

When the extracted circuit is not an ISDN circuit, i.e., when the extracted circuit is an analog circuit, the path replacement analyzing process function unit 91 connects the paths of the extracted circuit to each other to release an internet circuit corresponding to the extracted circuit. On the other hand, when the extracted circuit is an ISDN circuit, the path replacement analyzing process function unit 91 requests the circuit processing function unit 92 to perform a process so as to notify the switching equipment 2 of path replacement.

When there is a path replacement request, the circuit processing function unit 92 performs a routing optimization process (conventional path optimization process) to a circuit connected to the switching equipment 2 to make a path replacement request from the switching equipment 2.

Switching Equipment

Figure 10:
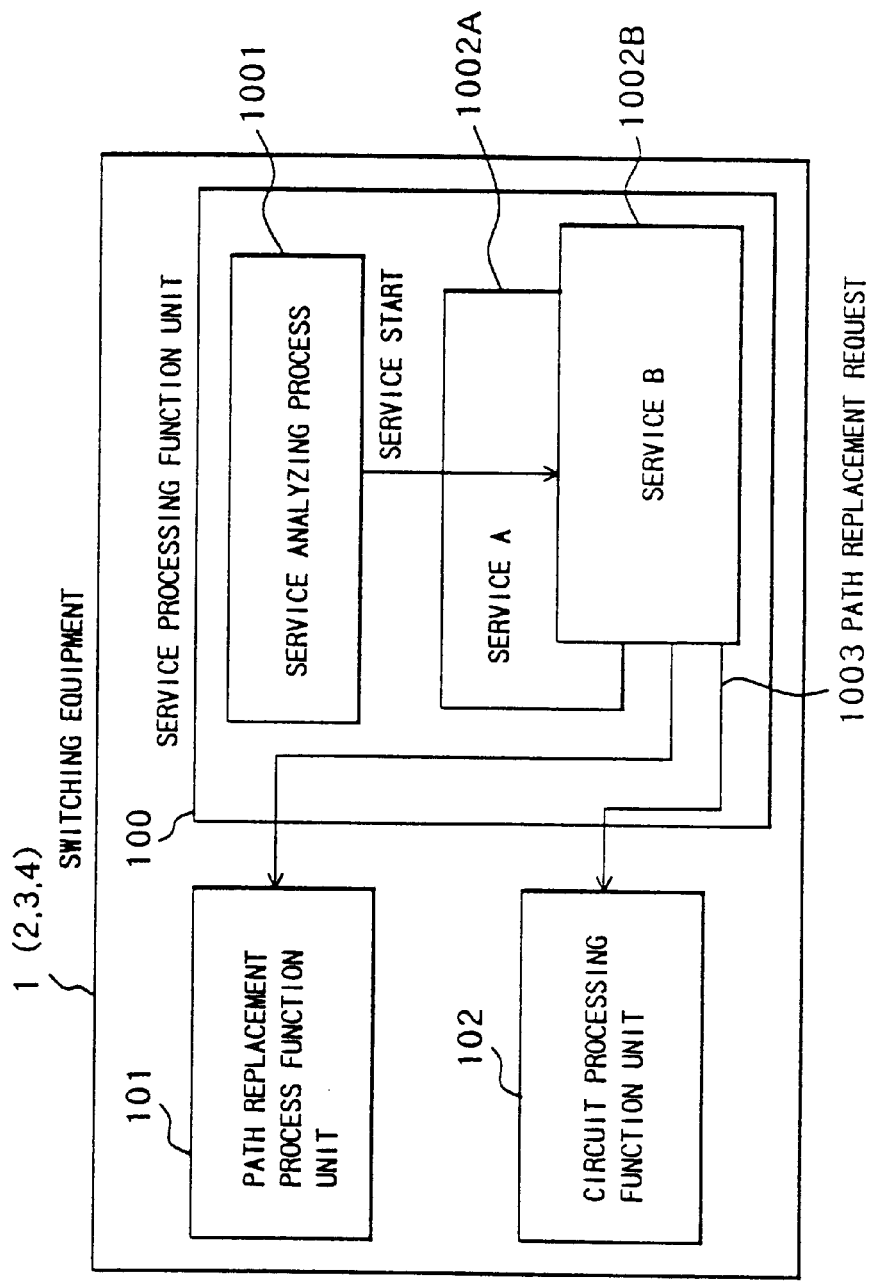
FIG. 10 is a block diagram showing the configuration of a switching equipment in FIG. 3.

Each of the switching equipment 1, 2, 3, and 4, as shown in FIG. 10, is constituted by a service processing function unit 100, a path replacement process function 101, and a circuit processing function unit 102. The service processing function unit 100 performs a service analyzing process 1001 for analyzing a request of a service to determine a start service and service processes 1002A and 1002B. The path replacement process function unit 101 performs path replacement on the basis of the path replacement information 85 (see FIG. 7).

The service processing function unit 100 executes a service according to a request of a destination. When the request service is a transfer service, and a received message is FACILITY (path optimization request), the service processing function unit 100 makes a path replacement request 1003 from the path replacement process function unit 101.

The path replacement process function unit 101 performs a path replacement process of the terminal 20 of a transfer source destination and the transfer destination terminal 21 on the basis of the information of the FACILITY (path optimization request) message, i.e., a routing optimization process, and makes a releasing request from gateway circuits used in the transfer source destination terminal 20 and the transfer destination terminal 21.

Call Transfer Operation

Figure 12:
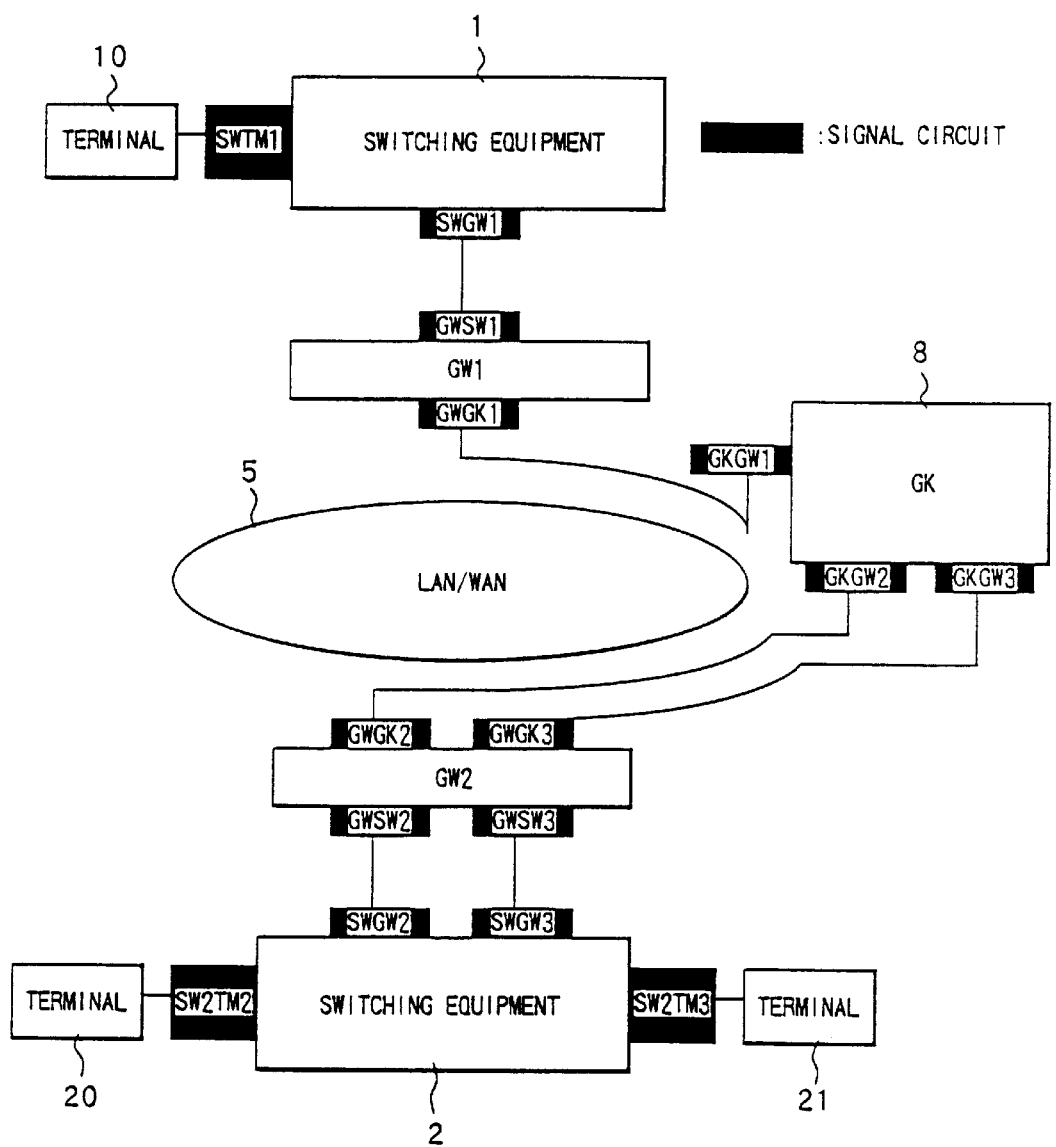
FIG. 12 is a block diagram showing signal circuit connection in a transfer operation in the embodiment.
Figure 13:
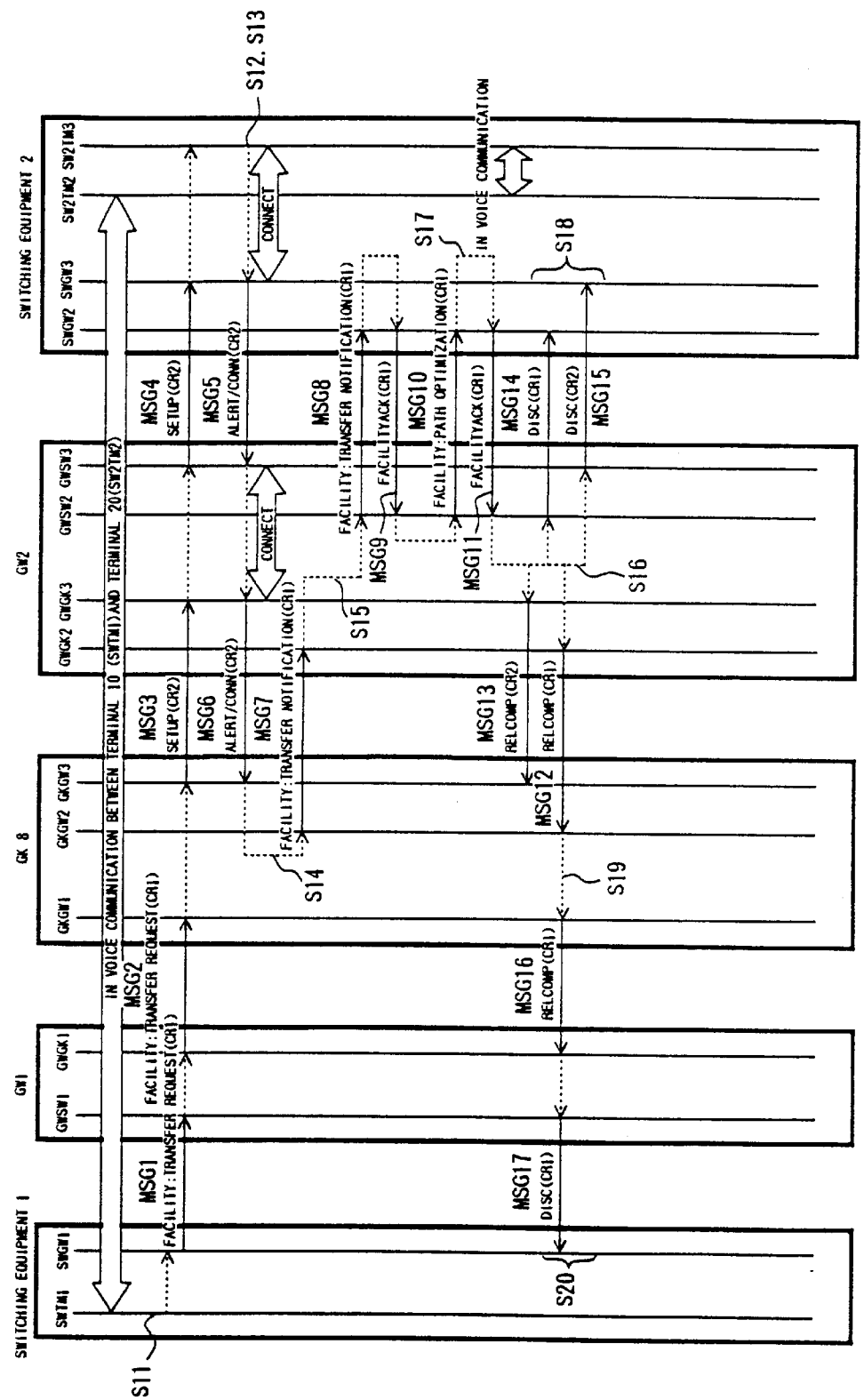
FIG. 13 is a sequence chart showing a message transfer operation in the embodiment.

As conditions for explaining the following call transfer operation, switching equipment, IP addresses of gateways and terminals, originating special numbers, and the presence/absence of path replacement have an environmental data configuration shown in FIG. 11. A signal channel (signal circuit) in transfer employs connection shown in FIG. 12. FIG. 13 shows an example of a message transfer sequence for explaining the call transfer operation.

In the internet telephony system shown in FIG. 3, in a voice communication state between the transfer source terminal 10 accommodated with the switching equipment 1 and the transfer source destination terminal 20 accommodated with the switching equipment 2, a case wherein the terminal 10 performs a transfer service to the transfer destination terminal 21 accommodated with the switching equipment 2 will be described below with reference to FIG. 3 and related diagrams.

After the terminal 10 depresses a transfer button, when a transfer destination address, i.e., an originating number "702+21" to the terminal 21 is dialed (process in FIG. 13: S11), in the switching equipment 1, the service processing function unit 100 performs the service analyzing process 1001 (see FIG. 10) by the operations (depression of the transfer button and dialing to the terminal 21) of the terminal 10 to perform the transfer service. At this time, in the switching equipment 1, an originating number to the terminal 21 which receives the number is edited into a FACILITY (transfer request) message MSG1, and transmits the FACILITY message MSG1 to the gateway GW1 by using a signal circuit SWGW1 shown in FIG. 12.

In the gateway GW1, when the FACILITY message MSG1 is received, the internet service processing function unit 90 performs the service analyzing process 901 to perform a transfer service. After the service is performed, in order to cause the circuit processing function unit 92 to transmit a FACILITY (transfer request) message MSG2 to the gate keeper 8, FACILITY message information of ISDN is protocol-converted into a FACILITY message of H.323 (H.450.2) protocol, and transmits the FACILITY message to the gate keeper 8 by using a signal circuit GWGK1 (shown in FIG. 12).

In the gate keeper 8, the FACILITY message MSG2 is received, the internet service processing function unit 80 performs the service analyzing process 801, and a transfer service is performed. In the transfer service process 802B, an originating destination (transfer destination) IP address is determined from an originating dial special number-IP address conversion table 830 of the concrete example shown in FIG. 14 on the basis of the information (transfer destination address) of the received FACILITY message MSG2, the determined IP address and the information of the received FACILITY message MSG2 are accommodated with the gate keeper circuit connection information table 84 shown in FIG. 6, and the circuit processing function unit 82 is started. In the circuit processing function unit 82, a signal circuit GKGW3 is formed on the basis of the determined transfer destination (connection destination) IP address, and a SETUP message MSG3 is edited according to the regulation of recommendation H.450.2 and transmitted to the gateway GW2.

In the gateway GW2, when the SETUP message MSG3 is received, the internet service processing function unit 90 performs the service analyzing process 901 to perform an internet incoming service. In the internet incoming service process 902A, the incoming destination switching equipment 2 is determined on the basis of the received SETUP message MSG3, and the circuit processing function unit 92 is started. In the circuit processing function unit 92, a signal circuit GWSW3 connected to the switching equipment 2 acquired, the received SETUP message MSG3 is protocol-converted by the protocol of the acquired circuit, and the incoming destination switching equipment 2 is called. In this case, since the circuit which connect the gateway GW2 and the switching equipment 2 to each other is an ISDN circuit, the received SETUP message MSG3 is converted into ISDN protocol, and a SETUP message MSG4 is transmitted.

In the switching equipment 2, when the SETUP message MSG4 is received, the service processing function unit 100 performs the service analyzing process 1001 to perform an incoming service. In the incoming service process 1002A, the incoming destination (transfer destination) terminal 21 is determined from the received SETUP message MSG4 to start the circuit processing function unit 102. In the circuit processing function unit 102, the terminal 21 is called (process in FIG. 13: S12). In the switching equipment 2, in reception of a response message from the terminal 21 (process in FIG. 13: S13), the incoming service process 1002A in the service processing function unit 100 performs mutual path connection between a signal circuit SW2TM3 corresponding to the terminal 21 in FIG. 12 and a signal circuit SWGW3 corresponding to the gateway GW2 to start the circuit processing function unit 102. In the circuit processing function unit 102, a CONN (response) message MSG5 is transmitted to the gateway GW2 by using the signal circuit SWGW3.

In the gateway GW2, in reception of the response message MSG5, the internet service processing function unit 90 performs a response process in the incoming service process 902A to start the circuit processing function unit 92. In the circuit processing function unit 92, a CONN (response) message MSG6 is transmitted to the gate keeper 8.

In the gate keeper 8, in response to the response message MSG6, the internet service processing function unit 80 starts the path replacement analyzing process function unit 81 in the transfer service process 802B. After the presence/absence of path replacement is determined, the circuit processing function unit 82 edits a FACILITY (transfer notification) message MSG7 and transmits the FACILITY message MSG7 to the signal circuit GWGK2 of the gateway GW2 (process in FIG. 13: S14).

In path replacement control of the gate keeper 8, a path replacement enabled/disabled table 860 of the concrete example shown in FIG. 15 is indexed by the IP addresses of gate keeper circuit connection information of a transmission destination (signal circuit GWGK2) of the FACILITY (transfer notification) message MSG7, and the contents of a path replacement enabled/disabled flag (1: path replacement is enabled, 0: path replacement is disabled) are determined. In this case, since the connection destination IP address of the signal circuit GWGK2 is "000. 000. 000. 002", the path replacement enabled/disabled flag is "1". In this case, since the path replacement is enabled, path replacement analysis is performed.

Figure 16:
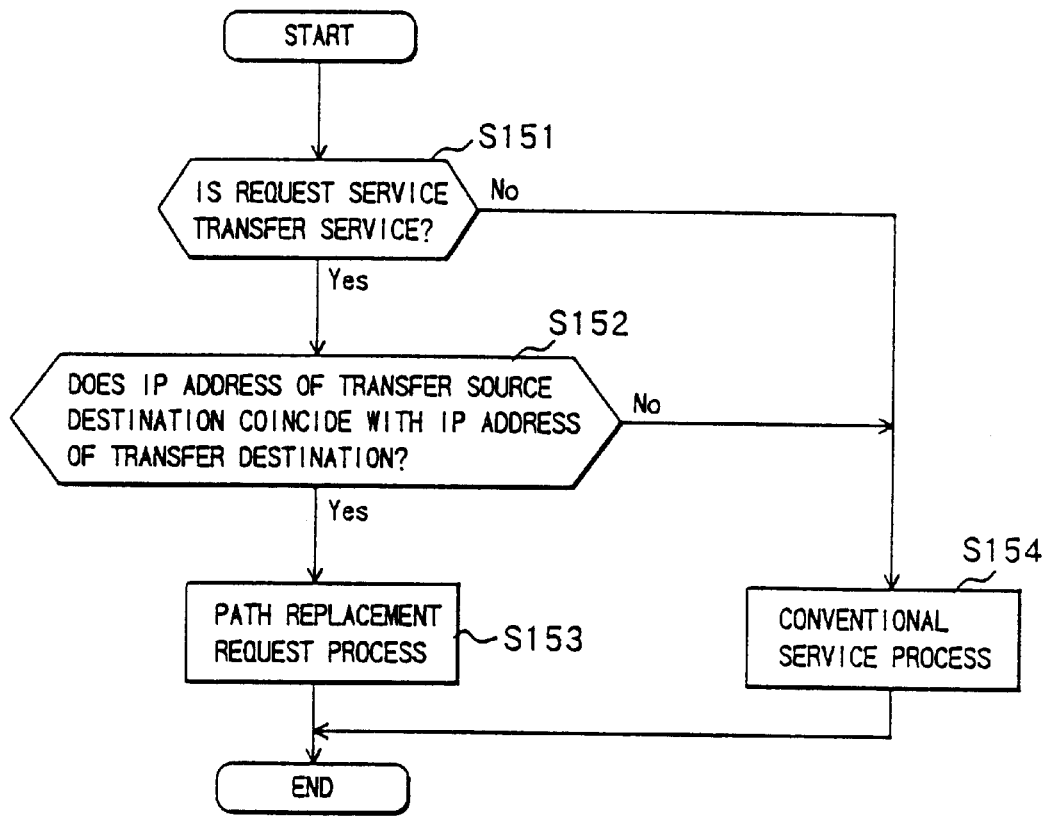
FIG. 16 is a flow chart showing a path replacement analyzing procedure of a gate keeper in the embodiment.

In the path replacement analysis in the gate keeper 8, path replacement is determined by the procedure (S151 to S154) shown in a path replacement analyzing flow shown in FIG. 16. More specifically, the path replacement analyzing process function unit 81 in the gate keeper 8 makes a determination by the IP addresses of the circuit connection information of the transfer source destination (GWGK2) and the transfer destination (GWGK3) and an execution service type. In this case, since it is determined by the path replacement analysis that path replacement is required, the path replacement information 85 shown in FIG. 7 is edited. In the circuit processing function unit 82, the edited path replacement information 85 is edited into the FACILITY (transfer notification) message MSG7 by the process S14 in FIG. 13, and the FACILITY message MSG7 is transmitted.

In the gateway GW2, in reception of the FACILITY (transfer notification) message MSG7, the internet service processing function unit 90 performs the service analyzing process 901 to perform a transfer service. In the service process 902B, the path replacement analyzing process function unit 91 is started. When it is determined by the start result that a path replacement notification to the switching equipment 2 is required, the circuit processing function unit 92 is requested to transmit the message of a routing optimization process (process in FIG. 13: S15, procedure in FIG. 17: S166). In the path replacement analyzing process function unit 91, path replacement analysis is performed according to the path replacement analyzing procedure (S161 to S168) in FIG. 17. In S166 of the path replacement analyzing procedure, in order to determine that path replacement notification to the switching equipment 2 is required, the following conditions are established. That is, after the conditions in S161 and S162 are satisfied, it is determined in S163 that a connection destination of a transfer destination voice channel number of the path replacement information is not a terminal which is directly accommodated with the self-gateway, i.e., that the connection destination is a terminal accommodated with the switching equipment 2. It is determined in S164 that the connection destination of the transfer destination voice channel number of path replacement information and the connection destination of a circuit to which the FACILITY message MSG7 is input are accommodated with the same switching equipment, and it is determined in S165 that a circuit type of the connection destination of the transfer destination voice channel number of the path replacement information is an ISDN circuit.

After the gateway GW2 transmits a FACILITY (transfer notification) message MSG8 to a signal circuit SWGW2 of the switching equipment 2, the gateway GW2 receives a FACILITY ACK (acknowledge) message MSG9 of the FACILITY (transfer notification) message MSG8 from the signal circuit SWGW2 of the switching equipment 2. After the gateway GW2 receives the FACILITY ACK (acknowledge) message MSG9, the gateway GW2 transmits the FACILITY (path optimization) message MSG10 to the signal circuit SWGW2 of the switching equipment 2. After the gateway GW2 receives a FACILITY ACK (acknowledge) message MSG11 of the FACILITY (path optimization) message MSG10, the gateway GW2 transmits RELCOMP (release) messages MSG12 and MSG13 to the signal circuits GWGK2 and GWGK3 corresponding to the gate keeper 8, and transmits DISC (disconnection) messages MSG14 and MSG15 to the signal circuits SWGW2 and SWGW3. The gateway GW2 performs a releasing process of the signal circuits GWGK2, GWGK3, GWSW2, and GWSW3 according to releasing message procedures of protocols of these circuits (process in FIG. 13: S16).

On the other hand, as a result of the path replacement analysis, after the conditions in S161 and S162 are satisfied, when it is determined in S163 that the connection destination is a terminal which is directly accommodated with the self-gateway, when it is determined in S164 that the connection destinations are not accommodated with the same switching equipment, or when it is determined in S165 that the circuit type is not an ISDN circuit, i.e., an analog circuit, it is determined in S167 that path replacement in the gateway GW2 is required. In the process in S167, the path of the transfer destination of the transfer destination voice channel number of the path replacement information and the path of the connection destination of the circuit to which the message MSG7 is input are connected to each other, and the internet circuit used in the transfer destination and the internet circuit to which the message is input are released. More specifically, the internet service processing function unit 90 causes the circuit processing function unit 92 to perform mutual connection between the path of the signal circuit GWSW2 and the signal circuit GWSW3. After the internet service processing function unit 90 requests the circuit processing function unit 92 to transmit the RELCOMP (release) messages MSG12 and MSG13 of the signal circuits GWGK2 and GWGK3, these signal circuits GWGK2 and GWGK3 are released.

When the switching equipment 2 does not satisfy the condition in S161 or S162 in path replacement analysis, i.e., when the request service is a transfer service, or the input message MSG7 has no path replacement information, path replacement notification or path replacement control are not required. For this reason, a conventional service process is performed in S168.

In the switching equipment 2, in reception of the FACILITY (transfer notification) message MSG8, the service processing function unit 100 performs the service analyzing process 1001 to perform a transfer service to the transfer source destination terminal 20. In the service process 1002B, display control of the terminal 20, i.e., control for displaying the telephone number or the like of the transfer destination terminal 21 on the display of the terminal 20 is performed, and the circuit processing function unit 102 is requested to transmit the FACILITY ACK (acknowledge) message MSG9 to the signal circuit SWGW2.

In the switching equipment 2, when the FACILITY (path optimization) message MSG10 is received, the path of a signal circuit SW2TM2 and the path of a signal circuit SW2TM3 are connected to each other in the determined routing optimization process, and the circuit processing function unit 102 is requested to transmit the FACILITY ACK (acknowledge) message MSG11 to the signal circuit SWGW2 (process in FIG. 13: S17). As a result, voice communication between the transfer source destination terminal 20 and the transfer destination terminal 21 is enabled.

With respect to a releasing operation of the signal circuits SWGW2 and SWGW3 in the switching equipment 2, when the DISC (disconnection) messages MSG14 and MSG15 from the gateway GW2 are received by these circuits, the signal circuits SWGW2 and SWGW3 are released according to the message procedure of ISDN layer 3 protocol recommendation (process in FIG. 13: S18).

When the RELCOMP (release) messages MSG12 and MSG13 are transmitted from the gateway GW2 to the gate keeper 8, the gate keeper 8 transmits a RELCOMP (release) message MSG16 to the gateway GW1, and performs a releasing process of the signal circuits GKGW1, GKGW2, and GKGW3 (process in FIG. 13: S19).

In addition, the gateway GW1 which receives the RELCOMP (release) message MSG16 from the gate keeper 8 transmits a DISC (disconnection) message MSG17 to the switching equipment 1. The switching equipment 1 which receives the DISC message MSG17 releases the signal circuits SWGW1, SWTM1, and GWSW1 according to the message procedure of ISDN layer 3 protocol recommendation (process in FIG. 13: S20).

Although only an embodiment of this invention has been described in detail above, those skilled in the art will readily appreciate that many modifications are possible in the preferred embodiment without departing from the novel teachings and advantages of this invention.

Accordingly, all such modifications are intended to be included within the scope of this invention as defined by the following claims.

What is claimed is:

1. An internet telephony system comprising:
a plurality of switching equipment which accommodate a plurality of terminals which can perform at least one of voice communication and data communication;
an internet network including a gate keeper; and
a plurality of gateways which connect the plurality of switching equipment to the internet network and make it possible to perform communication through the switching equipment and the internet network by communication protocol conversion,
wherein, in a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with the second switching equipment and the second terminal is performed,
the gate keeper checks whether path replacement for setting the call transfer operation is required or not, and adds information for the path replacement to an information element of a message regulated by a specific communication protocol related to the call transfer operation, when the path replacement is required, to notify the second switching equipment on a path replacement side of the information through a corresponding gateway,
the corresponding gateway checks whether the path replacement for setting the call transfer operation is required or not based on the information notified by the gate keeper, and notifies the second switching equipment on the path replacement side of the information when the path replacement is required, and
communication between the second terminal and the third terminal after the call transfer operation is provided by a path merely managed by the second switching equipment, and the path obtained after the call transfer operation is not through a circuit of the internet network.

2. An internet telephony system according to claim 1, wherein the specific communication protocol related to the call transfer operation is H.450.2.

3. An internet telephony system according to claim 1, wherein the gate keeper has a function of checking whether the path replacement is enabled/disabled by an internet protocol address of a notification destination.

4. An internet telephony system according to claim 3, wherein the gate keeper checks whether an internet protocol address of the second terminal of a transfer source destination corresponding to the first terminal of a transfer source coincides with an internet protocol address of the third terminal of a transfer destination.

5. An internet telephony system according to claim 1, wherein each of the plurality of terminals is one of a telephone terminal and a computer terminal.

6. An internet telephony system comprising:
a plurality of switching equipment which accommodate a plurality of terminals which can perform at least one of voice communication and data communication;
an internet network including a gate keeper; and
a plurality of gateways which connect the plurality of switching equipment to the internet network, make it possible to perform communication through the switching equipment and the internet network by communication protocol conversion, and accommodate a terminal which can perform at least one of voice communication and data communication,
wherein, in a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with a first gateway of the plurality of gateways, corresponding to the second switching equipment, and the second terminal is performed,
the gate keeper checks whether path replacement for setting the call transfer operation is required or not, and adds information for the path replacement to an information element of a message regulated by a specific communication protocol related to the call transfer operation, when the path replacement is required, to notify the second switching equipment on a path replacement side of the information through the first gateway,
the first gateway checks whether the path replacement for setting the call transfer operation is required or not based on the information notified by the gate keeper, and notifies the second switching equipment on the path replacement side of the information when the path replacement is required, and
communication between the second terminal and the third terminal after the call transfer operation is provided by a path managed by the second switching equipment and a path managed by the first gateway, and the paths obtained after the call transfer operation are not through a circuit of the internet network.

7. An internet telephony system according to claim 6, wherein the specific communication protocol related to the call transfer operation is H.450.2.

8. An internet telephony system according to claim 6, wherein the gate keeper has a function of checking whether the path replacement is enabled/disabled by an internet protocol address of a notification destination.

9. An internet telephony system according to claim 8, wherein the gate keeper checks whether path replacement is enabled/disabled by checking whether an internet protocol address of the second terminal of a transfer source destination corresponding to the first terminal of a transfer source coincides with an internet protocol address of the third terminal of a transfer destination.

10. An internet telephony system according to claim 6, wherein each of the plurality of terminals is one of a telephone terminal and a computer terminal.

11. An internet telephony system comprising:
a plurality of switching equipment which accommodate a plurality of terminals which can perform at least one of voice communication and data communication;
an internet network including a gate keeper; and
a plurality of gateways which connect the plurality of switching equipment to the internet network and make it possible to perform communication through the switching equipment and the internet network by communication protocol conversion,
wherein, in a call transfer operation in which transition from a communication state between a first terminal accommodated with a first switching equipment of the plurality of switching equipment and a second terminal accommodated with a second switching equipment of the plurality of switching equipment to a communication state between a third terminal accommodated with a third switching equipment connected to a first gateway of the plurality of gateways, corresponding to the second switching equipment, and the second terminal is performed,
the gate keeper checks whether path replacement for setting the call transfer operation is required or not, and adds information for the path replacement to an information element of a message regulated by a specific communication protocol related to the call transfer operation, when the path replacement is required, to notify the second and third switching equipment on a path replacement side of the information through the first gateway,
the first gateway checks whether the path replacement for setting the call transfer operation is required or not based on the information notified by the gate keeper, and notifies the second and third switching equipment on the path replacement side of the information when the path replacement is required, and
communication between the second terminal and the third terminal after the call transfer operation is provided by paths respectively managed by the second switching equipment and the third switching equipment and a path managed by the first gateway, and all of the paths obtained after the call transfer operation are not through a circuit of the internet network.

12. An internet telephony system according to claim 11, wherein the specific communication protocol related to the call transfer operation is H.450.2.

13. An internet telephony system according to claim 11, wherein the gate keeper has a function of checking whether the path replacement is enabled/disabled by an internet protocol address of a notification destination.

14. An internet telephony system according to claim 13, wherein the gate keeper checks whether path replacement is enabled/disabled by checking whether an internet protocol address of the second terminal of a transfer source destination corresponding to the first terminal of a transfer source coincides with an internet protocol address of the third terminal of a transfer destination.

15. An internet telephony system according to claim 11, wherein the second switching equipment and the third switching equipment are constituted by a plurality of switching equipment which are physically different from each other, and the plurality of switching equipment which are physically different from each other are logically connected to the same first gateway.

16. An internet telephony system according to claim 11, wherein each of the plurality of terminals is one of a telephone terminal and a computer terminal.

17. A gateway comprising:

means for checking whether path replacement for setting a call transfer operation is required or not;

based on information for the path replacement in an information element of a message regulated by a specific communication protocol related to the call transfer operation; and means for notifying a second switching equipment on a path replacement side of the information through self-gateway when the path replacement is required;

wherein, in the call transfer operation in which transition from a communication state, through an internet network, between a first terminal accommodated with a first switching equipment and a second terminal accommodated with the second switching equipment to a communication state between a third terminal accommodated with the second switching equipment and the second terminal is performed, communication between the second terminal and the third terminal after the call transfer operation is provided by a path merely managed by the second switching equipment, and the path obtained after the call transfer operation is not through a circuit of the internet network.

18. A gateway comprising:

means for checking whether path replacement for setting a call transfer operation is required or not based on information for the path replacement in an information element of a message regulated by a specific communication protocol related to the call transfer operation; and means for notifying a second switching equipment on a path replacement side of the information through self-gateway when the path replacement is required;

wherein, in the call transfer operation in which transition from a communication state, through an internet network, between a first terminal accommodated with a first switching equipment and a second terminal accommodated with the second switching equipment to a communication state between a third terminal accommodated with the self-gateway, corresponding to the second switching equipment, and the second terminal is performed, communication between the second terminal and the third terminal after the call transfer operation is provided by a path managed by the second switching equipment and a path managed by the self-gateway, and the paths obtained after the call transfer operation are not through a circuit of the internet network.

19. A gateway comprising:

means for checking whether path replacement for setting a call transfer operation is required or not based on information for the path replacement in an information element of a message regulated by a specific communication protocol related to the call transfer operation; and means for notifying a second switching equipment and a third switching equipment on a path replacement side of the information through self-gateway when the path replacement is required;

wherein, in the call transfer operation in which transition from a communication state, through an internet network, between a first terminal accommodated with a first switching equipment and a second terminal accommodated with the second switching equipment to a communication state between a third terminal accommodated with the third switching equipment connected to the self-gateway, corresponding to the second switching equipment, and the second terminal is performed, communication between the second terminal and the third terminal after the call transfer operation is provided by paths respectively managed by the second switching equipment and the third switching equipment and a path managed by the self-gateway, and all of the paths obtained after the call transfer operation are not through a circuit of the internet network.

* * * * *